United States Patent [19]

Derickson

[11] 4,130,830
[45] Dec. 19, 1978

[54] METHOD AND APPARATUS FOR HOMOGENEOUS EXPOSURE OF VIDEO DISPLAY SCREEN

[75] Inventor: Richard B. Derickson, Sunnyvale, Calif.

[73] Assignee: Atari, Inc., Sunnyvale, Calif.

[21] Appl. No.: 832,999

[22] Filed: Sep. 14, 1977

[51] Int. Cl.² ............................................. H04N 5/22
[52] U.S. Cl. ...................................... 358/22; 358/82; 358/93; 358/220; 358/242
[58] Field of Search ...................... 358/220, 93, 81, 82, 358/242, 22; 315/379, 395; 340/324 A, 324 AD

[56] References Cited
U.S. PATENT DOCUMENTS 3,441,668   4/1969   Townsend ............................ 358/220

Primary Examiner—Richard Murray
Attorney, Agent, or Firm—Townsend and Townsend

[57] ABSTRACT

A homogeneous screen exposure method for a video display tube used in a video game which may be exposed for prolonged periods to a fixed pattern is provided by utilizing the motion counters of the game which normally provide for a moving ball, for example, to generate a moving checkerboard pattern with which the fixed playfield pattern is exclusively ORed.

9 Claims, 5 Drawing Figures

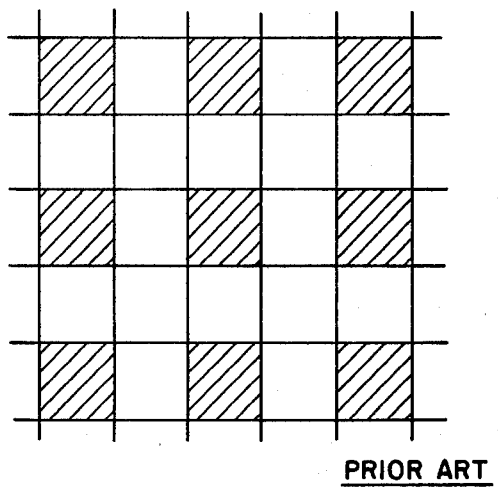
PRIOR ART
FIG.—1
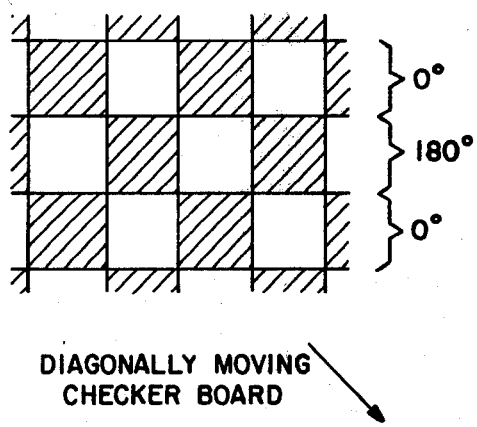
DIAGONALLY MOVING CHECKER BOARD
FIG.—2
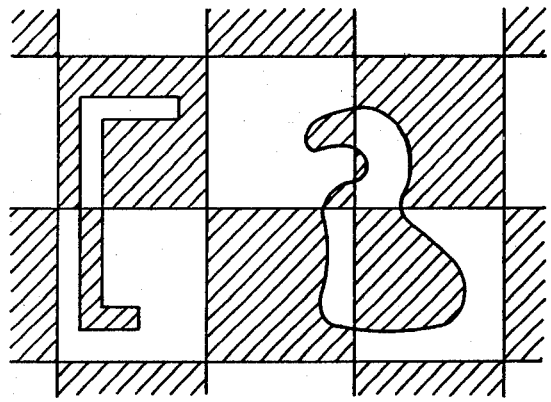
FIG.—3A
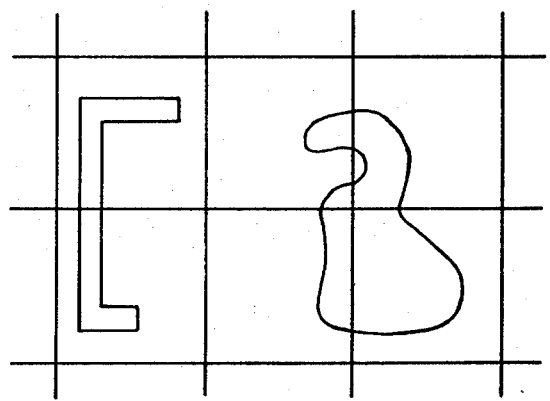
FIG.—3B

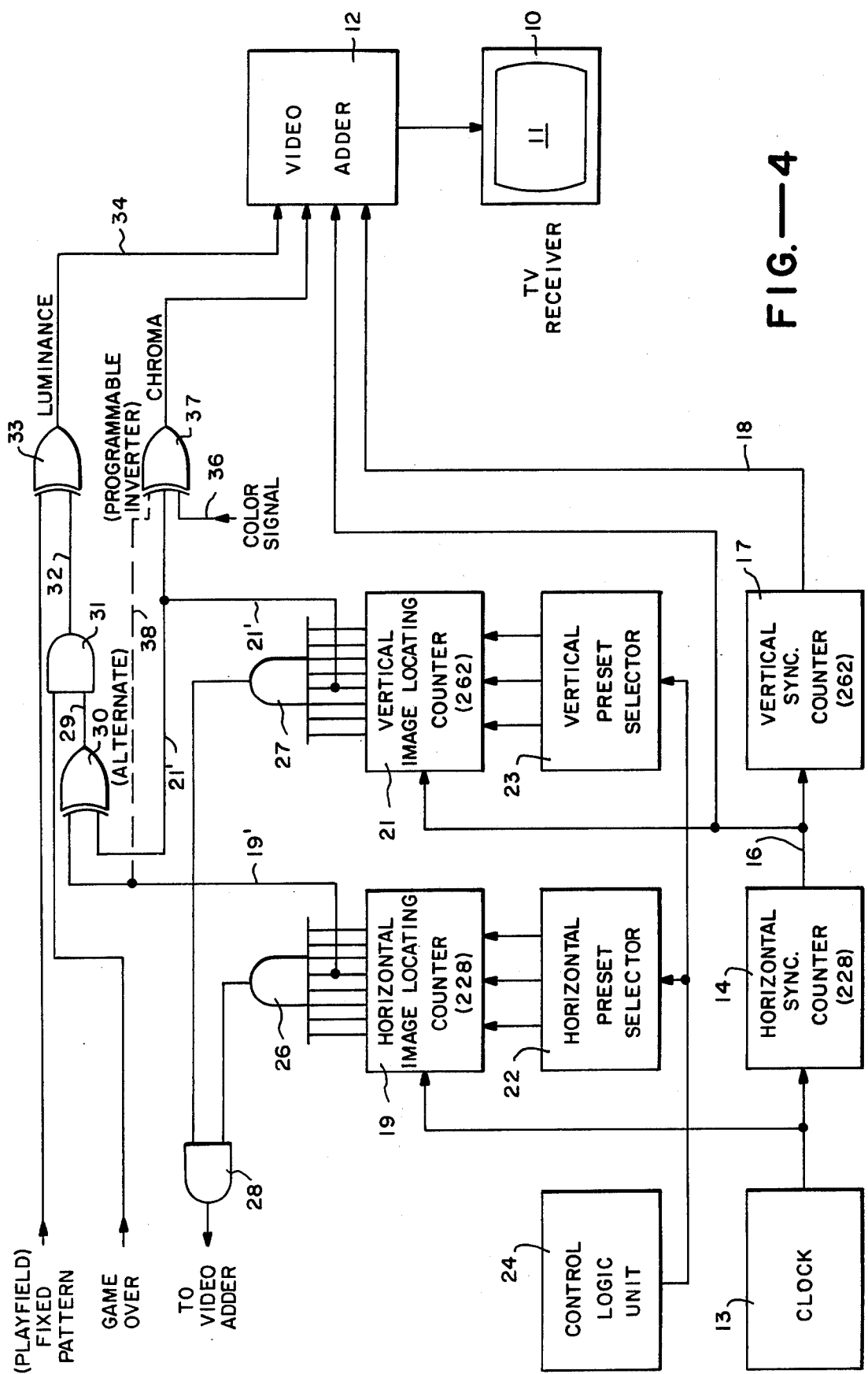
FIG.—4

METHOD AND APPARATUS FOR HOMOGENEOUS EXPOSURE OF VIDEO DISPLAY SCREEN

BACKGROUND OF THE INVENTION

The present invention is directed toward a method and apparatus for homogeneous exposure of video display screen and more specifically to a video game where a television picture tube would have prolonged exposure to a fixed pattern.

When a video game is not in active use (that is, the game is not being played), if it is of the coin-operated type it may still display a fixed pattern in order to attract prospective customers or players. Thus, a playfield may be displayed such as in a paddle and ball game with the outlines of a playing court along with a moving and bouncing ball. This is known as the attract mode.

To implement this attract mode in a ball/paddle game an array of moving squares has been provided such as shown in FIG. 1. The moving pattern was controlled by the same position circuitry as used for the moving ball. Such a pattern did not contribute to the homogeneous exposure of the television tube since the moving pattern was merely ORed with the fixed pattern and thus the fixed pattern remained unchanged. In addition, the moving array of squares did not form a checkerboard pattern but in contrast was inhomogenous and had a duty cycle of perhaps 25%.

Thus the fixed pattern especially in a coin-operated environment had a tendency to expose portions of the television tube phosphors to different amounts of luminance and thus cause uneven wear or aging of the phosphors. This was also true of the chroma or color signal.

OBJECTS AND SUMMARY OF THE INVENTION

It is, therefore, a general object of the present invention to provide a method and apparatus for the homogeneous exposure of video display screen.

In accordance with the above object there is provided a method of exposing the entire viewing area of a video display screen to the same amount of luminance where the screen normally displays a fixed pattern for prolonged periods of time. A signal for providing a moving pattern across the screen is generated. The moving pattern signal is exclusively ORed with a signal corresponding to a fixed pattern. The video display screen is driven with the logical result of the previous step.

From an apparatus point of view there is provided apparatus for exposing the entire viewing area of a video display screen to the same amount of luminance where the screen normally displays a fixed pattern for prolonged periods of time. Position counter means move an object formed by a beam traversing the video screen along a path across the screen. First gating means are responsive to a state of the position counter means corresponding to a fraction of the total count of the counter means for producing a signal representative of a checkerboard like pattern moving across the screen. Second gating means are responsive to the checkerboard pattern signal and to a signal representative of the fixed pattern for changing the luminance of the fixed pattern in accordance with the moving checkerboard.

BRIEF DESCRIPTION OF THE DRAWINGS

FIG. 1 is a partial view of a video display screen showing a moving array of squares which illustrates the prior art;

FIG. 2 is a portion of a video display screen illustrating the moving pattern formed by the present invention;

FIGS. 3A and 3B illustrate the moving pattern of FIG. 2 when a fixed pattern is being displayed on the screen; and FIG. 4 is a block diagram embodying the present invention and illustrating how the video signal for driving the video display screen is generated.

DETAILED DESCRIPTION OF THE PREFERRED EMBODIMENT

FIG. 2 illustrates a portion of a moving checkerboard pattern which inherently has a 50% duty cycle and which moves across the video display screen with some diagonal path. Such diagonal path is controlled by the motion circuitry of a video game such as a ball and paddle game where the moving pattern is effectively controlled by the same circuitry that controls the ball motion. The cross-hatching illustrates in both FIGS. 1 and 2 black or zero luminance levels with the remaining squares being the white or 100% luminance level. However, in a practical embodiment a color type video display screen would be used where in addition to luminance complementary colors would be displayed on every other horizontal line as indicated by the 0°, 180° legends.

FIGS. 3A and 3B illustrate the operation of the invention with a fixed pattern such as shown in FIG. 3B. As the moving checkerboard of FIG. 2 moves through the pattern of FIG. 3B, FIG. 3A results. In fact, the fixed pattern takes on the opposite luminance as the checkerboard portion with which it coincides at the time.

The circuitry for driving the video display screen 11 of television receiver 10 is shown in FIG. 4. Video adder unit 12 receives synchronizing, luminance and chroma signals and combines them with the proper radio frequency carrier to drive television receiver 10. A master clock 13 (which may use the standard color frequency of 3.58 MHz) drives a horizontal synchronization counter 14 which has a capacity of 228 pulses and which has on its output 16 a horizontal synchronization pulse which in turn drives a vertical sync counter 17 having a capacity of 262 which on its output 18 provides a vertical synchronizing pulse. The output of clock 13 similarly drives a horizontal image locating or position counter 19. The eight bit terminal count output of counter 14 drives the clock input of a vertical image locating or position counter 21. Both the vertical and horizontal image locating counters 19 and 21 are conventional eight bit presetable binary counters and can be preset to produce horizontal and/or vertical displays of an image on the video display screen 11 with respect to the locus defined by the counts in horizontal sync counter 14 and vertical sync counter 17.

Set signals are applied to the inputs of counters 19 and 21 by a horizontal preset selector 22 and a vertical preset selector 23, respectively. These are controlled by a control logic unit 24. Control logic unit 24 may be actuated by the manual control inputs of the video game.

The 8 line or bit outputs of image locating counters 19 and 21 are connected to the inputs of AND gates 26 and 27, respectively. Each one of the eight lines has, of course, a predetermined binary positional weight. The outputs of these AND gates are connected to the input of an AND gate 28 which in turn drives video adder 12 in order to provide, for example, the ball motion in a ball and paddle game. Thus far the foregoing circuitry is identical to that disclosed and claimed in U.S. Pat. No. 3,793,843 entitled "Video Image Control System For Amusement Device" and assigned to the present assignee.

In accordance with the invention a signal corresponding to a checkerboard pattern is formed on line 29 by use of an exclusive OR gate 31 which is responsive in general to states of position or image locating counters 19 and 21 corresponding to a fraction of their total count. Specifically horizontal image locating counter 19 has a $2^4$ weight line 19' inputed to exclusive OR gate 31; vertical image locating counter 21 has a 25 with line 21'. The order of magnitude difference provides a substantially square block. The respective counts, 228 and 262, indicated for the two counters are merely for the purpose of convenience in the design of the overall video game and the use of the color burst signal for clock 13.

The checkerboard signal on line 29 is ANDed with a "game over" signal in AND gate 31 (in other words, the checkerboard pattern only occurs when no game is in process and the attract mode is desired) and then the output of AND gate 31 on line 32 is again exclusively ORed by a gate 33 with the fixed playfield pattern. The pattern as discussed above may be the boundaries of a paddle and ball type game court. The output of gate 33 on line 34 is then a luminance signal to provide a moving checkerboard pattern which follows the trajectory of the moving object of the game such as a ball. Such pattern would typically be a diagonal pattern having various bounces which would be provided by control logic unit 24 in combination with horizontal and vertical selectors 22 and 23.

The respective binary weighted outputs 19', 21' of the horizontal counters 19 and 21 are in their binary one state for 16 or 32 counts of the counter and then switch to the other state. Thus if the vertical output 21' of counter 21 is considered by itself to be applied to the television tube 11 it would produce horizontal bands of 32 lines of alternating luminance. Similarly if the horizontal output 19' of counter 19 were applied to tube 11 alone it would produce vertical bands of 16 resolution elements across the screen of alternating luminance. An exclusive OR combination of the two will produce the desired checkerboard pattern. Moreover the exclusive ORing of this pattern with the fixed playfield pattern insures that such fixed pattern will have the same duty cycle as the checkerboard pattern which is 50% and thus homogeneous exposure of the screen to the same amount of luminance throughout its viewing area will be achieved.

From an overall logic point of view the two exclusive OR gates 31 and 33 could be regarded as three input parity logic means responsive to the output signals 19', 21' of the horizontal and vertical image locating counters, and the fixed pattern playfield signal. Specifically the luminance could be considered relatively black if the parity was odd; that is, if either one or three of the foregoing were true. Similarly a white or 100% luminance would be produced if parity were even; that is, if any two of the inputs were true.

From yet another logic standpoint the exclusive OR gates might be thought of as programmable inverters where one input is the control input and inverts the information signal on the other input when the control input changes state.

Since the fixed pattern normally includes a color component indicated as the color signal on a line 36 provision must be made to provide for the homogeneous screen exposure to the color signal in order that all of the three color phorphors might be aged evenly. In the preferred embodiment this is provided by exclusively ORing by means of gate 37 the color signal on line 36 with the line 21' from vertical image locating counter 21. Since exclusive OR gate 37 is effectively a programmable inverter the color signal will be shifted in phase 180° every 32 lines as indicated in FIG. 2 to provide for homogeneous screen exposure. The connection of the inverter 37 to the vertical image locating counter works well where the moving object or ball has some vertical vector. Where there is pure horizontal motion however, an alternate connection 38 to line 19' of the horizontal image locating counter 19 may be used.

A typical generator for color signal 36 might be a random number generator.

Although in the preferred embodiment specific circuitry for the image locating counters 19 and 21 and specific binary taps have been illustrated any similar motion circuitry can be utilized to achieve the homogeneous screen exposure effect of the present invention.

What is claimed is:

1. A method of exposing the entire viewing area of a video display screen to the same amount of luminance where the screen normally displays a fixed pattern for prolonged periods of time comprising the following steps: generating a signal for providing a moving pattern across said screen; exclusively ORing said moving pattern signal with a signal corresponding to said fixed pattern; and driving said video display screen with the logical result of the previous step.

2. A method as in claim 1 where said moving pattern has a 50% luminance duty cycle.

3. A method as in claim 1 where the video display screen includes an image forming beam driven by horizontal and vertical position counter means for providing a moving object and where said generating step includes exclusively ORing outputs of said horizontal and vertical position counters to generate said moving pattern signal.

4. A method as in claim 3 where said counter outputs correspond to a fraction of the total count of said counter means to form a moving pattern which is checkerboard like.

5. A method as in claim 3 where said fixed pattern includes a color component provided by a color signal said method including the step of exclusively ORing such signal with an output of one of said counters.

6. A method as in claim 1 where said fixed pattern includes a color component provided by a color signal said method including the step of complementing said color signal in accordance with said moving pattern.

7. Apparatus for exposing the entire viewing area of a video display screen to the same amount of luminance where the screen normally displays a fixed pattern for prolonged periods of time comprising: position counter means for moving an object formed by a beam traversing said video display screen along a path across said screen; first gating means responsive to a state of said position counter means corresponding to a fraction of the total count of said counter means for producing a signal representative of a checkerboard like pattern moving across said screen; and second gating means responsive to said checkerboard pattern signal and to a signal representative of said fixed pattern for changing the luminance of said fixed pattern in accordance with said moving checkerboard.

8. Apparatus for exposing the entire viewing area of a video display screen to the same amount of luminance where the screen normally displays a fixed pattern for prolonged periods of time comprising: horizontal and vertical position counter means for moving an object formed by a beam traversing said video display screen along a path across said screen; parity logic means responsive to, (a) a binary state of the horizontal counter means corresponding to a fraction of its total count,
(b) a binary state of the vertical counter means corresponding to a fraction of its total count, and
(c) a digital signal representation of said fixed pattern, for generating a luminance signal for said video display screen of one type for odd parity of (a), (b), and (c) and of the opposite type for even parity.

9. Apparatus as in claim 8 where said luminance signal is relatively black for odd parity and white for even parity.

* * * * *